Dec. 6, 1927.  
D. E. GAMBLE  
1,652,007  
CLUTCH PLATE  
Filed Jan. 24, 1927
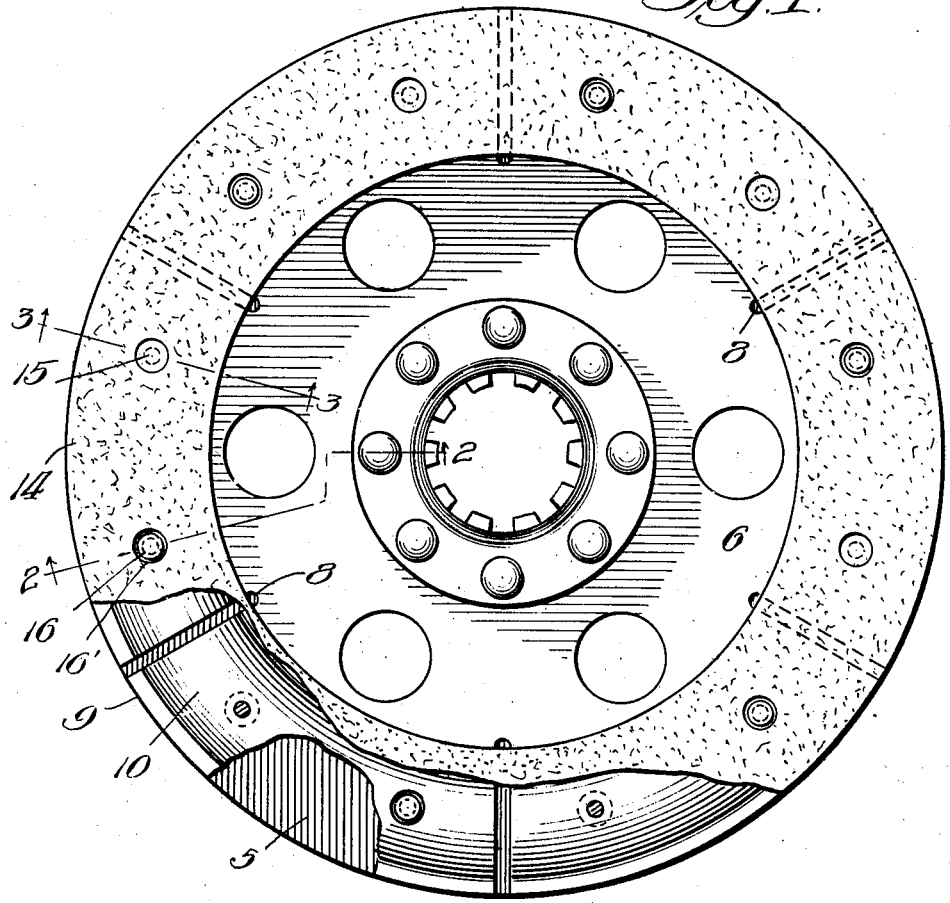
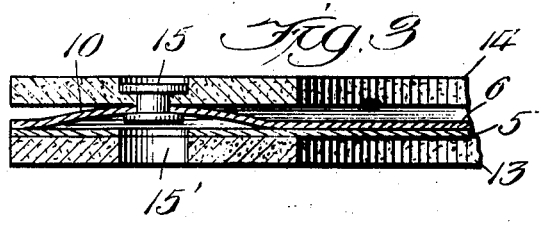
Inventor:  
David E. Gamble  
by Wm. O. Bell  
Atty.

Patented Dec. 6, 1927.

1,652,007

UNITED STATES PATENT OFFICE.

DAVID E. GAMBLE, OF DETROIT, MICHIGAN, ASSIGNOR TO THE BORG & BECK COMPANY, OF CHICAGO, ILLINOIS, A CORPORATION OF ILLINOIS.

CLUTCH PLATE.

Application filed January 24, 1927. Serial No. 163,083.

This invention relates to friction clutches of the kind wherein a friction plate driven member is interposed between two parts of a driving member and is adapted to be gripped or clamped by the parts under sufficient pressure to impart motion from the driving member to the driven member.

The object of the invention is to provide a novel friction plate with friction rings which will take hold smoothly and evenly throughout their contact area when pressure is initially applied, and by a yielding but rapid progressive action make the clutch act quickly and efficiently without grabbing or jerking.

In the accompanying drawings I have illustrated a selected embodiment of the invention, and referring thereto:

Fig. 1 is a side elevation of the clutch plate showing one of the friction rings and also one of the sectors partly broken away.

Fig. 2 is an enlarged sectional view on the line 2—2 of Fig. 1.

Fig. 3 is a similar view on the line 3—3 of Fig. 1.

In the drawings the clutch plate comprises two flat plate members 5, 6 secured face to face by rivets 7. The plate 5 is flat throughout its area, but the plate 6 is divided by radial slots 8 into a plurality of sectors 9 which are relatively long and are bowed radially of the plate at 10. All the bows project to one side of the plate and their outer margins 11 and their inner margins 12 are substantially flat.

I employ hard, solid, continuous friction rings 13, 14 which are secured on opposite sides of the two-member clutch plate. The friction ring 14 is fastened by rivets 15 to the bowed sectors of the plate 6 which form a seat for the ring, the rivets being located between one end and the middle of the sector. The plate 5 and the ring 13 are provided with registering openings 15' opposite the rivets 15 to accommodate the inner end of the rivets so that the bowed sectors may flatten out to permit full contact of the sectors with the plate 5 and of the ring 14 with the sectors 9. The ring 13 is fastened by rivets 16 to its seat on the plate 5 opposite the ring 14, and the rivets 16 are located in the ring 13 and the plate 5 opposite registering openings 16' in the ring 14 and the plate 6, which are provided to accommodate the inner end of the rivets 16 when the clutch plate is subjected to pressure between the two parts of the driving member of the clutch and the bows 10 of the plate 6 are flattened. The opening 16' is located at a distance from one end of the sector corresponding with the location of the opening 15' relative to the other end of the sector so that, in substantial effect, the rivets 15, 16 will be spaced apart substantially an equal distance peripherally of the clutch plate and the openings 15', 16' will, of course, be correspondingly spaced. Thus each sector 10 is fastened to the same ring 14 and at intervals alternating with the fastening rivets of the plate 5 with the other ring 13.

My improved clutch plate is a driven member adapted to be arranged between two parts of a driving member of a clutch to be gripped and clamped thereby for imparting motion from the driving member to the driven member. The outer faces of the friction rings make engagement throughout their entire area with the two parts of the driving member when the pressure is initially applied, and the bows of the sectors 10 provide for a yielding, gripping or clamping engagement between the friction rings of the clutch plate and the parts of the driving member of the clutch to insure that the clutch will take hold smoothly and easily when thrown in. The friction ring 13 is always in full contact with the plate member 5, but the friction ring 14 is mounted on the bows 10 which yield under pressure to provide a rapid, progressive action which will cause the clutch to take hold quickly but without grabbing or jerking. The margins 11 and 12 of the sectors bear upon the plate member 5 and when pressure is applied to the clutch plate the sectors will quickly flatten with a progressive action to provide an efficient and relatively quick acting clutch which operates smoothly and evenly.

I claim:

1. A clutch plate having continuous friction rings fastened thereto on opposite sides thereof, said plate having a flat seat for one of said rings and a segmental bowed seat for the other ring.

2. A clutch plate having continuous friction rings fastened thereto on opposite sides thereof, said plate having a flat seat for one of said rings and a segmental bowed seat concentric of the plate for the other ring.

3. A clutch plate having continuous fric tion rings fastened thereto on opposite sides thereof, said plate having a flat seat for one of said rings and a discontinuous radially bowed seat concentric of the plate for the other ring.

4. A clutch plate comprising two plate members fastened together, one of said members being flat adjacent its periphery to form a seat for a friction ring and the other member being bowed radially of the plate and adjacent its periphery to form a seat for the other friction ring, and friction rings mounted on said seats.

5. A clutch plate comprising two plate members fastened together, one of said members being flat adjacent its periphery to form a seat for a friction ring and the other member being bowed radially of the plate and adjacent its periphery to form a seat for the other friction ring, said bowed portion being slotted radially to provide a plurality of spaced sections, and friction rings mounted on said seats.

6. A clutch plate comprising two plate members fastened together, one of said members being flat adjacent its periphery to form a seat for a friction ring and the other member being bowed radially of the plate and adjacent its periphery to form a seat for the other friction ring, friction rings mounted on said seats, and fastening means securing said friction rings to the plates, said fastening means being spaced apart and connected alternately with one plate and its ring and with the other plate and its ring.

7. A clutch plate comprising two plate members fastened together, one of said members being flat adjacent its periphery to form a seat for a friction ring and the other member being bowed radially of the plate and adjacent its periphery to form a seat for the other friction ring, friction rings mounted on said seats, and fastening means securing said friction rings to the plates, said plates and rings being provided with registering openings opposite the fastening means to accommodate the inner ends of the rivets when the bowed seats are flattened.

DAVID E. GAMBLE.